United States Patent
Wieners et al.

(10) Patent No.: US 6,838,042 B1
(45) Date of Patent: Jan. 4, 2005

(54) LABEL MADE OF POLYOLEFIN FILM

(75) Inventors: Gerhard Wieners, Frankfurt (DE); Wilfrid Tews, Bechhofen (DE)

(73) Assignee: Trespaphan GmbH, Neunkirchen (DE)

( * ) Notice: Subject to any disclaimer, the term of this patent is extended or adjusted under 35 U.S.C. 154(b) by 176 days.

(21) Appl. No.: 10/089,261

(22) PCT Filed: Oct. 9, 2000

(86) PCT No.: PCT/EP00/09826
§ 371 (c)(1), (2), (4) Date: Mar. 26, 2002

(87) PCT Pub. No.: WO01/28755
PCT Pub. Date: Apr. 26, 2001

(30) Foreign Application Priority Data

Oct. 15, 1999 (DE) .......................................... 199 49 898

(51) Int. Cl.[7] ........................... B29C 49/24; B32B 27/20
(52) U.S. Cl. ................. 264/509; 428/32.18; 428/32.22; 428/515
(58) Field of Search ....................... 264/509; 428/32.18, 428/32.22, 515

(56) References Cited

U.S. PATENT DOCUMENTS

| | | | |
|---|---|---|---|
| 5,242,650 A | | 9/1993 | Rackova et al. |
| 5,405,667 A | | 4/1995 | Heider |
| 5,516,563 A | * | 5/1996 | Schumann et al. ......... 428/34.2 |
| 5,804,127 A | * | 9/1998 | Takatori et al. ............. 264/515 |
| 6,210,795 B1 | * | 4/2001 | Nelson et al. ............... 428/347 |

FOREIGN PATENT DOCUMENTS

| | | |
|---|---|---|
| DE | 42 03 338 A1 | 8/1993 |
| EP | 0 436 044 A1 | 7/1991 |
| EP | 0 559 484 A1 | 9/1993 |
| EP | 0 593 080 A1 | 4/1994 |
| EP | 0 787 581 A1 | 8/1997 |
| JP | 01278345 | 11/1989 |
| JP | 04047614 | 2/1992 |
| JP | 06009804 | 1/1994 |
| WO | WO 97/30903 A1 | 8/1997 |
| WO | WO 99/55518 A1 | 11/1999 |

* cited by examiner

*Primary Examiner*—Suzanne E. McDowell
(74) *Attorney, Agent, or Firm*—ProPat, L.L.C.

(57) ABSTRACT

The invention relate to the use of a multi-layer polypropylene film as an in-mold label used in a blow molding methods. According to the invention, the label film is laid inside the hollow mold of a blow molding machine, comprises an inner protective layer that faces the receptacle to be molded, and comprises an outer protective layer that is in contact with the hollow mold, whereby the inner protective layer has a roughness Rz of at least 3.5 μm.

21 Claims, No Drawings

LABEL MADE OF POLYOLEFIN FILM

The present invention relates to the use of a polypropylene film as in-mold label for blow molding.

In the blow molding of hollow articles, a tube of a suitable polymer is extruded continuously or batchwise. The tube is laid in a multipart mold cavity, pinched off at the lower end and at the same time cut off at the upper end. A nozzle is inserted in a tightly fitting manner into the upper opening which remains, and air is blown in through this nozzle during the actual blowing operation. In the process, the tube bubble is blown up and brought into close contact with the wall of the mold. The mold is then opened, tubes projecting at the top and bottom are removed from the demolded blow molding, and the process is started afresh.

Labeling during production of containers by blow molding is known in the prior art and is referred to as in-mold labeling. In this process, a label is laid in the opened blow mold, usually by a robot, in such a way that the printed outside of the label is in contact with the mold wall, and the unprinted inside faces the blow molding to be shaped. During introduction of the tubular melt and shaping of the blow molding by the air pressure, the still-plastic surface of the polymer composition comes into close contact with the label and bonds thereto to give a labeled container.

In this labeling process, it must be ensured that the label lies against the mold wall in a flat and fold-free manner. This is achieved either by means of vacuum applied to fine air-removal perforations in such a way that the perforations are substantially sealed by the label, or by means of electrostatic forces between the electrostatically charged label and the earthed mold.

In this production process, the label is either, particularly in the case of simple label shapes, supplied in roll form and cut to size at the blow-molding machine ("cut in place") or, in the case of more complex label shapes, cut to size in advance and away from the blow-molding machine, stacked and later segregated from the stack at the blow-molding machine (cut & stack process) and introduced individually into the respective blow mold.

Films made from thermoplastics have recently increasingly been used for the labeling of containers. The films which are suitable for a use of this type have to have a selected property profile in order to ensure that the label film and molding nestle against one another in a flat and bubble-free manner and bond to one another. Solutions, in some cases technically complex, have been found for this in the prior art. Thus, in one embodiment, a BOPP film is coated on the inside with an adhesive in a cross-hatch pattern. It is known that a coating of this type is associated with considerable costs.

In addition, the various printing processes and labeling processes require different film properties, in particular different property profiles. This means that very frequently it is not just a single good property that facilitates use of the film for the proposed purpose. Instead, only a large number of properties which have to be achieved simultaneously in a film guarantee usability for the proposed purpose.

Thus, the use of an opaque film has been proposed for blow-mold in-mold labeling, which film has at least one base layer comprising vacuole-initiating fillers and pigments, and top layers on both sides of this base layer, where the film has a total thickness of at least 85 $\mu$m, and the base layer comprises a combination of tertiary aliphatic amine and fatty acid amide and the two top layers comprise antiblocking agents, and the density of the film is in a range from 0.65 to 0.85 g/cm$^3$ and has been corona- or flame-treated on both sides.

It has furthermore been proposed to employ opaque films of this type in combination with special additive formulations and specially selected film thicknesses in order to guarantee the usability thereof for the purpose according to the invention.

The known films are suitable in accordance with the invention for labeling blow moldings having a flattened oval cross section, in particular on the flatly curved surfaces. In the case of blow moldings having smaller radii of curvature, for example having a round-oval cross section or in the case of labeling of the narrow sides of flattened oval blow moldings, bubbles occur which have a considerable adverse effect on the appearance. These bubbles are generally tightly filled with air.

The object of the present invention was to provide an inexpensive label film which is intended to be suitable for in-mold labeling in the blow-molding process. In particular, it should be possible to apply the film as bubble-free label to curved bodies, including those having a small radius of curvature, and should not have any other optical defects. At the same time, other important service properties of the film, such as gloss, printability and destackability, must not be impaired.

The object on which the invention is based is achieved by the use of a multilayered polypropylene film as an in-mold label in the blow-molding process. In the use according to the invention, the label film is inserted into the mold of a blow-molding machine. The label film has an inner top layer facing the container to be molded and an outer top layer which is in contact with the mold. The inner top layer has a roughness Rz of at least 3.5 $\mu$m.

It has been found that the rough inside of the label film guarantees its usability for the purpose according to the invention.

In a preferred embodiment, the film used as blow-mold label is an opaque film. For the purposes of the present invention, the term "opaque film" means a non-transparent film whose transparency to light (ASTM-D 1003-77) is at most 70%, preferably at most 50%.

The base layer of the multilayered film generally comprises a polyolefin, preferably a propylene polymer, and optionally vacuole-initiating fillers and further additives in effective amounts in each case. In general, the base layer comprises at least 50% by weight, preferably from 60 to <100% by weight, in particular from 70 to <100% by weight, of the polyolefin, in each case based on the weight of the layer.

Preferred polyolefins are propylene polymers. These propylene polymers comprise from 90 to 100% by weight, preferably from 95 to 100% by weight, in particular from 98 to 100% by weight, of propylene units, have a melting point of 120° C. or above, preferably from 150 to 170° C., and generally have a melt flow index of from 0.5 to 8 g/10 min, preferably from 2 to 5 g/min, at 230° C. and a force of 2.16 kg (DIN 53735). Isotactic propylene homopolymer having an atactic content of 15% by weight or less, copolymers of ethylene and propylene having an ethylene content of 5% by weight or less, copolymers of propylene with $C_4$–$C_8$-olefins having an olefin content of 5% by weight or less, terpolymers of propylene, ethylene and butylene having an ethylene content of 10% by weight or less and having a butylene content of 15% by weight or less are preferred propylene polymers for the base layer, with isotactic propylene homopolymer being particularly preferred. The stated percentages by weight are based on the respective polymer.

Also suitable is a mixture of said propylene homopolymers and/or copolymers and/or terpolymers with other polyolefins, in particular made from monomers having from 2 to 6 carbon atoms, where the mixture comprises at least 50% by weight, in particular at least 75% by weight, of propylene polymer.

Suitable other polyolefins in the polymer mixture are polyethylenes, in particular HDPE, LDPE, VLDPE and LLDPE, where the proportion of these polyolefins is in each case not in excess of 15% by weight, based on the polymer mixture.

In the opaque embodiment, the opaque base layer of the film comprises fillers in a maximum amount of 40% by weight, preferably from 1 to 30% by weight, in particular from 2 to 20% by weight, based on the weight of the opaque layer. For the purposes of the present invention, the fillers are pigments and/or vacuole-initiating particles.

For the purposes of the present invention, pigments are incompatible particles which essentially do not result in vacuole formation when the film is stretched. The coloring action of the pigments is caused by the particles themselves. In general, the mean particle diameter of the pigments is in the range from 0.01 to 1 μm, preferably from 0.01 to 0.7 □m, in particular from 0.01 to 0.4 □m. Conventional pigments are materials such as, for example, aluminum oxide, aluminum sulfate, barium sulfate, calcium carbonate, magnesium carbonate, silicates, such as aluminum silicate (kaolin day) and magnesium silicate (talc), silicon dioxide and titanium dioxide, of which preference is given to the use of white pigments, such as calcium carbonate, silicon dioxide, titanium dioxide and barium sulfate.

The titanium dioxide particles generally comprise at least 95% by weight of rutile and are preferably employed with a coating of inorganic oxides and/or of organic compounds containing polar and nonpolar groups. $TiO_2$ coatings of this type are known in the prior art.

For the purposes of the present invention, "vacuole-initiating fillers" are solid particles which are incompatible with the polymer matrix and result in the formation of vacuole-like cavities when the films are stretched, with the size, nature and number of the vacuoles being dependent on the size of the solid particles and the stretching conditions, such as stretching ratio and stretching temperature. The vacuoles reduce the density and give the films a characteristic pearl-like opaque appearance caused by light scattering at the "vacuole/polymer matrix" interfaces. In general, the mean particle diameter of the particles is from 1 to 6 μm, preferably from 1.5 to 5 μm. The chemical character of the particles plays a secondary role.

Conventional vacuole-initiating fillers are inorganic and/or organic, polypropylene-incompatible materials, such as aluminum oxide, aluminum sulfate, barium sulfate, calcium carbonate, magnesium carbonate, silicates, such as aluminum silicate (kaolin clay) and magnesium silicate (talc), and silicon dioxide, of which calcium carbonate and silicon dioxide are preferred. Suitable organic fillers are the conventional polymers which are incompatible with the polymer of the base layer, in particular those such as HDPE, copolymers of cyclic olefins, polyesters, polystyrenes, polyamides and halogenated organic polymers, preference being given to polyesters, such as, for example, polybutylene terephthalate, and cycloolefin copolymers. For the purposes of the present invention, "incompatible materials or incompatible polymers" means that the material or polymer is in the film in the form of a separate particle or separate phase.

The base layer optionally comprises pigments in an amount of from 0.5 to 10% by weight, preferably from 1 to 8% by weight, in particular from 1 to 5% by weight.

Vacuole-initiating fillers are preferably present in an amount of from 0.5 to 25% by weight, preferably from 1 to 15% by weight, in particular from 1 to 10% by weight. The data are based on the weight of the base layer.

The vacuole-initiating fillers reduce the density of the film. It has been found that, in a preferred embodiment, it is particularly advantageous to keep the density of the film within narrow limits, preferably in a range from 0.5 to 0.85 g/cm$^3$, in particular between 0.65 and 0.85. Films having a density of less than 0.5 are difficult to produce and, on use as in-mold labels in blow molding, frequently exhibit optical defects in the form of the so-called orange-peel effect, where the label film is deformed on the surface with formation of millimeter-sized bubbles. If the density is greater than 0.85 g/cm$^3$, the adhesion to the container becomes worse.

Besides the preferably opaque base layer, the film according to the invention comprises an inner and an outer top layer. For the purposes of the present invention, top layers are outer layers whose outer surface forms the film surface. For the purposes of the present invention, the inner surface, or the inner top layer, is that side of the film which faces the container and bonds to the molding during blow molding. The outer surface or top layer is naturally the opposite side, which is in contact with the blow mold during the labeling process and forms the outer surface in the labeled container.

The outer top layer of the multilayered film generally comprises at least 70% by weight, preferably from 75 to <100% by weight, in particular from 90 to 98% by weight, of a propylene polymer and in general antiblocking agents and stabilizers and, if desired, further conventional additives, such as lubricants, for example fatty acid amides or siloxanes, in effective amounts in each case. Preference is given to embodiments of the outer top layer which comprise fatty acid amides. The above data in % by weight are based on the weight of the top layer.

The propylene polymer of the outer top layer is preferably a copolymer of propylene and ethylene or propylene and butylene or propylene and another olefin having from 5 to 10 carbon atoms. Also suitable for the purposes of the invention are terpolymers of ethylene and propylene and butylene or ethylene and propylene and another olefin having from 5 to 10 carbon atoms. It is also possible to employ mixtures or blends of two or more of said copolymers and terpolymers.

For the outer top layer, preference is given to ethylene-propylene copolymers and ethylene-propylenebutylene terpolymers, in particular random ethylene-propylene copolymers having an ethylene content of from 2 to 10% by weight, preferably from 5 to 8% by weight, or random ethylene-propylene-1-butylene terpolymers having an ethylene content of from 1 to 10% by weight, preferably from 2 to 6% by weight, and a 1-butylene content of from 3 to 20% by weight, preferably from 8 to 10% by weight, in each case based on the weight of the copolymer or terpolymer.

The copolymers and terpolymers described above generally have a melt flow index of from 1.5 to 30 9/10 min, preferably from 3 to 15 g/10 min. The melting point is in the range from 120 to 140° C. The blend of copolymers and terpolymers described above have a melt flow index of from 5 to 9 g/10 min and a melting point of from 120 to 150° C. All the melt flow indices given above are measured at 230° C. and a force of 2.16 kg (DIN 53735).

In accordance with the invention, the inner surface of the multilayered film is rough. The Rz value (at a cut-off value of 0.25 mm) of the roughness here is at least 3.5 μm, preferably from at least 4.0 to 10 μm, in particular from 4.5 to 8 μm. It has been found that a rough inner surface of the film has a very favorable effect on its use as blow-mold label. Against expectations, the adhesion to the container is at the same time not impaired by the rough surface. It has been found that, in particular, the formation of bubbles is greatly reduced, and in some cases even completely prevented, even in the case of relatively highly curved surfaces.

The surface roughness presumably contributes toward air cushions which form between the container and label during blow molding not being included. The rough surface forms fine channels which facilitate escape of the air.

In principle, various ways of producing a rough surface are available to the person skilled in the art. As part of the present invention, it has been found that it is particularly advantageous to produce this roughness by blending polypropylene with incompatible or partially compatible polymers. This process is technically simple to implement since the production of rough surfaces by mixing incompatible polymers is known per se in the prior art. It has been found that, in this way, sufficient roughness is formed in order to facilitate "deaeration" of the applied label, but at the same time the adhesion to the molding is not impaired. In addition, other important processing properties of the film are not adversely affected or are even favorably affected, for example the film can be destacked better.

The inner top layer of the multilayered film therefore preferably consists of a mixture or blend of two incompatible or only partially compatible plastics which separate from one another in separate phases during production of the film. A suitable mixture can essentially consist, for example, of polyethylenes PE and polypropylenes PP. Mixtures which essentially consist of PE and propylene copolymers or terpolymers have proven particularly suitable here. The mixing ratio here is selected in such a way that the inner surface of the multilayered film has a suitable roughness. Mixtures of PE and PP or propylene copolymers and terpolymers are suitable for the application if the mixing ratio (weight ratio) is between PE:PP=1:12 and 5:1, in particular between 1:5 and 1:1.6.

The polyethylene of the mixture described above can be a high-density or low-density polyethylene, it being possible to prepare the latter either by the high-pressure or the low-pressure (or Ziegler-Natta) process. The melt flow index, measured at 190° C./2.16 kg, here can be between 0.1 and 30 g/10 min, preferably between 0.1 and 10 g/10 min in particular from 0.5 to 5 g/10 min.

The propylene polymer of the mixture for the inner top layer is preferably a copolymer of propylene and ethylene or propylene and butylene or ethylene and butylene or propylene and another olefin having from 5 to 10 carbon atoms. Also suitable for the purposes of the invention are terpolymers of ethylene and propylene and butylene or ethylene and propylene and another olefin having from 5 to 10 carbon atoms. It is also possible to employ mixtures or blends of two or more of the said copolymers and terpolymers.

For the mixture with PE, preference is given to ethylene-propylene copolymers and ethylene propylene-butylene terpolymers, in particular random ethylene-propylene copolymers having an ethylene content of from 2 to 10% by weight, preferably from 5 to 8% by weight, or random ethylene-propylene-1-butylene terpolymers having an ethylene content of from 1 to 10% by weight, preferably from 2 to 6% by weight, and a 1-butylene content of from 3 to 20% by weight, preferably from 8 to 10% by weight, in each case based on the weight of the copolymer or terpolymer.

The copolymers and terpolymers described above generally have a melt flow index of from 1.5 to 30 g/10 min, preferably from 3 to 15 g/10 min. The melting point is in the range from 120 to 140° C. The blend of copolymers and terpolymers described above has a melt flow index of from 5 to 9 g/10 min and a melting point of from 110 to 150° C. All the melt flow indices given above are measured at 230° C. and a force of 2.16 kg (DIN 53735).

The inner top layer generally comprises at least 70% by weight, preferably from 75 to <100% by weight, in particular from 90 to 98% by weight (based on the weight of the top layer), of the mixture of propylene polymers and polyethylene. In addition, antiblocking agents and stabilizers and, if desired, further conventional additives, such as lubricants, for example fatty acid amides or siloxanes, may be present in effective amounts in each case.

For the purposes of the present invention, it is likewise possible to produce a suitable surface roughness of the inner top layer by other measures. For example, it is possible to increase the formation of β-spherolites on cooling of the pre-film by technical measures associated with the process or by corresponding , β-nucleating agents in the inner top layer, with pit-like deformations being formed on the surface during subsequent stretching which likewise facilitate deaeration of the label during labeling. Mechanical methods, such as, for example, embossing methods, are basically also possible, albeit not preferred, since downstream measures of this type are expensive.

With respect to the additives present, it is preferred for the base layer to comprise a tertiary aliphatic amine in an amount of from 0.02 to 0.3% by weight, preferably from 0.05 to 0.2% by weight, and fatty acid amides in an amount of from 0.04 to 0.4% by weight, preferably from 0.07 to 0.25% by weight, and glycerol monostearate in an amount of from 0.05 to 0.4% by weight, preferably from 0.10 to 0.25% by weight.

Tertiary aliphatic amines include compounds of the general formula $R_3N$, in which R is a fatty acid radical or a $C_{12}$–$C_{18}$-alkyl radical or a hydroxyl-substituted alkyl radical, where the radicals R may be identical or different. Hydroxyl-substituted alkyl radicals are preferably hydroxyethyl, hydroxypropyl or hydroxybutyl radicals. Particular preference is given to N,N-bis(2-hydroxyethyl) alkylamines. In industry, use is frequently made of mixtures of differently substituted tertiary aliphatic amines, which may also contain hydroxyalkyl chains extended by oxyalkylidene groups. In addition, N,N-bishydroxyalkyl fatty acid esters may also be used.

The carboxamides include amides of a carboxylic acid having from 8 to 24 carbon atoms, or mixtures of these amides. Particular preference is given to erucamide, oleamide, stearamide and the like.

Suitable glycerol monostearates are in industry likewise substance mixtures which, besides the stearyl radical, may also contain further fatty acid radicals and differ with respect to the substitution pattern on the glycerol radical. Particularly advantageous mixtures are those having a high proportion of alpha-glycerol monostearate.

The usual amount of antiblocking agent in the top layers is in the range from 0.05 to 2% by weight, preferably from 0.15 to 0.6% by weight. Fatty acid amides may be present in the top layer in an amount of from 0.05 to 0.3% by weight. In addition, the top layers may also comprise siloxanes in an amount of from 0.05 to 1.0% by weight, preferably from 0.1 to 0.5% by weight.

Suitable antiblocking agents are inorganic additives, such as silicon dioxide, calcium carbonate, magnesium silicate, aluminum silicate, calcium phosphate and the like, and/or incompatible organic polymers, such as polyamides, polyesters, polycarbonates, and/or crosslinked organic polymers, such as polymethacrylates and polysiloxanes and the like, preference being given to benzoguanamine-formaldehyde polymers, silicon dioxide and calcium carbonate. The mean particle size is between 1 and 6 μm, in particular between 2 and 5 μm.

The total thickness of the film is generally at least from 50 to 150 □m, preferably from 60 to 120 □m, in particular from 75 to 100 □m. Thin films of less than 50 □m, in spite of a rough inside surface, readily exhibit bubbles on use as a label, which frequently appear full to bursting or inflated.

The thickness of the outer top layer is preferably in the range from 0.3 to 5 μm, in particular from 0.7 to 2.5 μm. Within the scope of the present invention, it has been found that a comparatively thick outer top layer is advantageous for the film appearance, which is advantageous for the quality of the print image on the printed outside of the label film. It has been found that, for opaque base layers having a layer thickness of up to 70 μm, the top layer thickness is comparatively unimportant. It has been found that a uniform appearance is particularly difficult to achieve with very thick opaque base layers of greater than 80 μm. This problem has been solved by providing the thick opaque base layer with particularly thick top layers of greater than 1.5 μm.

The layer thickness of the inner top layer is generally in a range from 0.5 to 5 μm. Advantages with respect to adhesion of the label to the blow molding arise if the layer thickness of the inner top layer is in the range from 1 to 4 μm, preferably from 2 to 4 μm. Furthermore, particularly good flat lying arose on processing of the film (printing, stacking and segregation) if the thickness of the top layer on the inside was equal to or not greater than 100% higher than the top layer on the inside.

In order very substantially to meet the various requirements, an embodiment of the film having an outer top layer of from 1.5 to 2.5 μm and an inner top layer of from 2.5 to 4 μm is particularly advantageous.

The film according to the invention has at least three layers and always comprises as essential coextruded layers the base layer and at least one top layer on both sides, with embodiments having an opaque base layer being preferred. If desired, four- and five-layered embodiments are also possible, in which the opaque layer forms the base layer of the film and an interlayer has been applied to the surfaces of the base layer on one or both sides.

Frequently encountered embodiments of BOPP films are corona- or flame-treated on one side, preferably on the outer top layer, in order to anchor printing inks, metal layers or adhesives to be applied.

The opposite, inner side usually remains untreated. On laying in the blow-molding machine in accordance with the cut & stack process, the in-mold label film according to the invention proved to be particularly simple and reliable to segregate in an embodiment with corona- or flame-pretreatment on both sides.

The invention furthermore relates to a process for the production of the multilayered film according to the invention by the coextrusion process, which is known per se.

This process is carried out by coextruding the melts corresponding to the individual layers of the film through a flat-film die, taking off the resultant film over one or more rolls for solidification, subsequently, if desired, biaxially stretching (orienting) the film, heat-setting the optionally biaxially stretched film, and corona- or flame-treating the film on one side, preferably on both surface layers.

The biaxial stretching (orientation) can be carried out simultaneously or consecutively, with consecutive biaxial stretching, in which stretching is firstly carried out longitudinally (in the machine direction) and then transversely (perpendicular to the machine direction), being particularly favorable.

As is conventional in the coextrusion process, the polymer or polymer mixture of the individual layers is firstly compressed and liquefied in an extruder, it being possible for any additives added already to be present in the polymer. The melts are then forced simultaneously through a flat-film die (slot die), and the extruded multilayered film is taken off on one or more take-off rolls at a temperature of from 10 to 90° C., preferably from 20 to 60° C., during which it cools and solidifies.

The film obtained in this way is preferably then stretched in the longitudinal direction at a temperature of below 140° C., preferably in the range from 110 to 125° C., in a ratio of from 4:1 to 7:1 and in the transverse direction at a temperature above 140° C., preferably from 145 to 160° C., by a factor of from 6:1 to 11:1. The longitudinal stretching is advantageously carried out with the aid of two rolls running at different speeds corresponding to the desired stretching ratio, and the transverse stretching is advantageously carried out with the aid of an appropriate tenter frame.

The biaxial stretching of the film is followed by heat-setting (heat treatment) thereof, in which the film is held at a temperature from 110 to 150° C. for from about 0.5 to 10 seconds. The film is subsequently wound up in a conventional manner by means of a wind-up unit.

After the biaxial stretching, one, preferably both, surface (s) of the film is (are), as mentioned above, preferably usually corona- or flame-treated by one of the known methods.

For the alternative corona treatment, the film is passed between two conductor elements serving as electrodes, with such a high voltage, usually an alternating voltage (about 10,000 V and 10,000 Hz), being applied between the electrodes that spray or corona discharges can occur. Due to the spray or corona discharge, the air above the film surface is ionized and reacts with the molecules of the film surface, causing formation of polar inclusions in the essentially non-polar polymer matrix. The treatment intensities are in the usual range, preferably from 38 to 45 mN/m.

The invention is now explained by the examples below.

EXAMPLE 1

A three-layer film having an ABC layer structure, i.e. a top layer A had been applied to the base layer B on the side intended for printing, referred to as "outer", and a top layer C had been applied to the opposite, "inner" side, was extruded as the sum by the coextrusion method from a flat-film die at an extrusion temperature of 260° C. The top layers A and C were corona-treated.

The essential components of the base layer B were the following:

| | |
|---|---|
| 88.65% by weight | of a propylene homopolymer (PP) having an n-heptane-soluble content of 4.5% by weight (based on 100% PP) and a melting point of 165° C. and a met flow index of 3.2 g/10 min at 230° C. and a load of 2.16 kg (DIN 53 735); |
| 6.00% by weight | of TiO₂ via masterbatch ®P 8555 LM, supplier Schulman GmbH, HüttenstraBe 211, D-54578 Kerpen; |

-continued

| | |
|---|---|
| 0.10% by weight | of N,N bis(2-hydroxyethyl)($C_{10}$–$C_{20}$) alkylamine (® Armostat 300) |
| 0.25% by weight | of erucamide |
| 5.00% by weight | of calcium carbonate having a mean particle size of 3 μm |

The top layer A consisted of a random ethylene-propylene copolymer from Solvay (Eltex PKS 409), having an ethylene content of 4.5% by weight. The melting point of the ethylene-propylene copolymer was 134° C., and the melt flow index (230° C./2.16 kg) was 7.0 g/10 min.

The top layer C consisted of a mixture of

| | |
|---|---|
| 74.8% by weight | of a random ethylene-propylene copolymer from Solvay (Eltex PKS 409), having an ethylene content of 4.5% by weight, a melting point of 134° C. and a melt flow index of 7.0 g/10 min at 230° C. and 2.16 kg |
| 25% by weight | of an HDPE in blown-film quality having a density of 0.934 and an MFI of 0.15 g/10 min at 190° C. and 2.16 kg, |
| 0.1% by weight | of antiblocking agent (® Syloblock 45) and |
| 0.1% by weight | of erucamide. |

All layers contained 0.12% by weight of pentaerythrityl tetrakis[4-(3,5-di-tertiarybutyl4-hydroxyphenyl)propionate] (®Irganox 1010) as stabilizer and 0.06% by weight of calcium stearate as neutralizer.

After coextrusion, the extruded three-layer film was, via the corresponding process steps, taken off and cooled via a first take-off roll and a further trio of rolls, subsequently stretched longitudinally, stretched transversely, set and corona-treated, with the following conditions, in detail, being selected:

| | |
|---|---|
| Extrusion: | extrusion temperature 260° C. |
| Longitudinal stretching: | stretching roll T = 122° C. |
| Longitudinal stretching by a factor of | 4.9 |
| Transverse stretching: | heating zones T = 170° C. |
| Stretching zones | T = 159° C. |
| Transverse stretching by a factor of | 9.5 |
| Setting: | temperature T = 115° C. |
| Corona treatment: | voltage: 10,000 V frequency: 10,000 Hz |

Directly after production, the multilayered film produced in this way had a surface tension of from 40 to 41 mN/m on the outer side and from 39 to 40 mN/m on the inner side. The film had a thickness of approximately 90 μm, with the thickness of top layer A being about 2 μm and that of top layer C being 4 □m. The film had a density of 0.72 g/cm³.

The film was printed, cut into the label shape and stacked. The label stacks were provided in the usual manner at the blow-molding machine. A blow-molding machine with automatic label feed was fitted with a mold "A" for a bulge-shaped bottle with vertical, upward-facing lip. The geometry of the bottle mold A was selected in such a way that a horizontal section at half the height of the area to be labeled had a length to width ratio of 131 to 91 mm. The blow-molding machine was loaded with HD-PE blow-molding material and operated under the usual processing conditions for HD-PE.

The results of the experiment are described in the table below.

EXAMPLE 2

Example 1 was repeated, with the base layer containing, as lubricant and antistatic,

| | |
|---|---|
| 0.15% by weight | of glycerol monostearate |
| 0.05% by weight | of N,N-bis(2-hydroxyethyl)($C_{10}$–$C_{20}$) alkylamine (® Armostat 300) |
| 0.05% by weight | of erucamide. |

In top layer C, the PE described above and the PP described above were additionally employed in the ratio 40:60. The process parameters (extruder speed) were set in such a way that, in contrast to Example 1, the total thickness of the film was 60 μm, and the thickness of the top layer on the inside was 3 μm.

EXAMPLE 3

Example 1 was repeated, with the thickness of the film being 70 μm, its density being 0.8 g/cm³, the thickness of the top layer A on the outside being 1.5 μm, the thickness of the top layer C on the inside being 3 μm, and PE and PP being present in the ratio 25:75.

EXAMPLE 4

Example 1 was repeated, with the mixture of the inner top layer C comprising, instead of HDPE, 25% by weight of an LDPE (Borealis LE 0609) having a density of 0.923 and a melt flow index of 0.85 g/10 min at 190° C. and 2.16 kg.

COMPARATIVE EXAMPLE 1

Example 1 was repeated, with the thickness of the film being 90 μm. The two top layers had the same composition as the outer top layer A in Example 1, i.e. essentially consisting of random ethylene-propylene copolymer.

COMPARATIVE EXAMPLE 2

Comparative Example 1 was repeated, but the blow-molding machine was fitted with a bulge-shaped bottle mold "B" which likewise has a vertical, upward-facing lip. However, the geometry of the bottle mold "B" was selected in such a way that a horizontal section at half the height of the area to be labeled had a length to width ratio of 135 to 82 mm with the long side approximately corresponding to a circle having a radius of 285 mm.

COMPARATIVE EXAMPLE 3

Example 1 was repeated, with the thickness of the film being 40 μm; the thickness of the top layer on the inside was 3 μm.

COMPARATIVE EXAMPLE 4

Example 1 was repeated, with the thickness of the two top layers being 0.7 μm.

COMPARATIVE EXAMPLE 5

Example 1 was repeated, with the density of the film being 0.52 g/cm³.

EXAMPLE 5

Comparative Example 3 was repeated, with the density of the film being 0.65 g/cm³.

COMPARATIVE EXAMPLE 6

Example 3 was repeated, with the density of the film being 0.86 g/cm 3, and the thickness of the inner top layer being 2 μm.

COMPARATIVE EXAMPLE 7

Example 1 was repeated, with only the outside of the film being corona-treated.

COMPARATIVE EXAMPLE 8

Example 1 was repeated, with the thickness of the outer top layer being 1 μm.

The raw materials and films were characterized using the following measurement methods:

Melt Flow Index

The melt flow index of the propylene polymers was measured in accordance with DIN 53 735 at a load of 2.16 kg and at 230° C. and at 190° C. and 2.16 kg for polyethylenes.

Melting Points

DSC measurement, maxima of the melting curve, heating rate 20 K/min.

Roughness Measurement

As a measure of the roughness of the insides of the films, the roughness values Rz of the films were measured in accordance with DIN 4768 Part 1 and DIN 4777, as well as DIN 4772 and 4774 by means of an S8P perthometer from Feinprüf Perthen GmbH, Göttingen, by the profile method. The measurement head, a single-skid probe system in accordance with DIN 4772, was fitted with a probe tip having a radius of 5 μm and an cone angle of 90° with a probe force of from 0.8 to 1.12 mN and a skid having a radius of 25 mm in the sliding direction. The vertical measurement range was set at 62.5 μm, the probe zone to 5.6 mm and the cut-off of the RC filter in accordance with DIN 4768/1 to 0.25 mm.

Density

The density is determined in accordance with DIN 53 479, Method A.

Assessment of the handling properties:

Curl tendency: a film sheet in DIN A4 format is laid with the underside and the upper side on a flat substrate. After any static charge has dissipated, whether and to what extent the edges of the film lift up from the substrate is assessed and, where appropriate, measured. The curl tendency is regarded as good if the edge height is less than 1 mm, moderate if it is up to 2 mm.

Segregation ability: the frequency with which a handling machine takes more than one film sheet from the stack during loading of a sheet offset printing machine or the blow-molding machine is assessed. The destackability is regarded as good at an incorrect removal rate of less than 1:10,000, poor at greater than 1:5000.

Mold charging: the error rate on laying the label in the blow mold is assessed. Frequent errors are folding, turned-in edges and, in the case of electrostatic location, incorrect positioning due to movement in the mold. The charging ability is regarded as good at an error rate of less than 1:10,000, and poor at greater than 1:5000.

Adhesion.

It is assessed (A) whether the edge of the label can be lifted without using a tool, (B) whether a film detached from the substrate at the edge can be peeled off without destruction, and (C) whether the label detaches from the substrate after flexural stressing at a flexural radius of less than 3 cm. It is regarded as poor if (A) the edge spontaneously detaches in places from more than 1 in 100 blow moldings, if (B) the label detached at the edge can be peeled off without destruction from more than 1 in 100 blow moldings or if (C) the label detaches from the substrate after flexural stressing at a flexural radius of less than 3 cm.

Appearance of the labeled bottle: the number and size of raised bubbles is assessed, and in addition the bubbles are classified by type and size. The appearance of a labeled bottle is classified as good if less than 30 bubbles of the orange-peel type are visible on the label and as moderate if more than 200 bubbles are visible.

Large bubbles: the appearance of a labeled bottle is classified as good if not more than 3 bubbles of not greater than 3 mm in diameter and not greater than 0.5 mm in height are visible. The appearance is regarded as poor if more than 15 relatively small bubbles of not greater than 3 mm in diameter and not greater than 0.5 mm in height or one bubble of greater than 10 mm in diameter or 1 mm in height are evident. The bottles that count are the worst ones.

The table below shows the properties of the in-mold-labeled, blow-molded bottles from the examples and comparative examples.

|  | Roughness Rz nm | Handling | Adhesion | Appearance |
| --- | --- | --- | --- | --- |
| Example 1 | 5.8 | good | good | good |
| Example 2 | 4.7 | good | good | good |
| Example 3 | 4.6 | good | good | good |
| Example 4 | 5.5 | good | good | good |
| Comparative Example 1 | 3.2 | good | good in the particles in contact | large inflated bubbles |
| Comparative Example 2 | 3.0 | good | good | a large number of small bubbles in individual bottles |
| Comparative Example 3 | 5.3 | segregation good; film kinks easily | good in the particles in contact | individual inflated bubbles |
| Comparative Example 4 | 3.1 | good | poor (detaches at edge flexural test poor) | large inflated bubbles; gloss poor |
| Comparative Example 5 | 5.5 | segregation good; film kinks easily | good | poor (orange peel) |

-continued

| | Roughness Rz nm | Handling | Adhesion | Appearance |
|---|---|---|---|---|
| Example 5 | 5.4 | still good | good | still good |
| Comparative Example 6 | 3.5 | very good | poor (detaches at edge, can be detached substantially without destruction) | poor (wavy appearance after spontaneous detachment from blow molding) |
| Comparative Example 7 | 4.0 | moderate (segregation flawed) | good | good |
| Comparative Example 8 | | poor (tendency to curl during printing) | good | good |

What is claimed is:

1. An in-mold label in a blow-molding process comprising a multilayerd polypropylene film, said film comprising a base layer an inner top layer facing a container to be molded and an outer top layer in contact with a mold, said inner top layer exhibiting a roughness Rz of at least 3.5 μm.

2. An in-mold label according to claim 1, wherein the inner top layer comprises a mixture of at least two polymers which are not compatible with one another.

3. An in-mold label according to claim 2, wherein the mixture consists of a polyethylene and polypropylene or polypropylene copolymer.

4. An in-mold label according to claim 2, wherein the mixture comprises PE and PP in a ratio of from 5 to 50% by weight.

5. An in-mold label according to claim 2, wherein the mixture comprises polyethylene and polypropylene in a weight ratio of polyethylene to polypropylene of from 1:12 to 5:1.

6. An in-mold label according to claim 1, wherein the base layer is an opaque layer that comprises vacuole-initiating fillers, and the density of the film is from 0.65 to 0.85 g/cm$^3$.

7. An in-mold label according to claim 1, wherein the thickness of the film is at least 50 μm.

8. An in-mold label according to claim 1, wherein the thickness of the inner top layer is between 0.5 and 5 μm.

9. An in-mold label according to claim 1, wherein the thickness of the outer top layer is between 0.3 and 5 μm.

10. An in-mold according to claim 1, wherein the film comprises ethoxylated fatty acid amide in its base layer.

11. An in-mold label according to claim 1, wherein the roughness is induced by increasing the formation of β-spherolites within said inner top layer.

12. A method of using a multilayered polypropylene film as an in-mold label in a blow-molding process in which the label film is laid in the mold of a blow-molding machine and has an inner top layer facing a container to be molded and an outer top layer in contact with a mold, said inner top layer exhibiting a roughness Rz of at least 3.5 μm.

13. A method according to claim 12, wherein the inner top layer comprises a mixture of at least two polymers which are not compatible with one another.

14. A method according to claim 13, wherein the mixture consists of a polyethylene and polypropylene or polypropylene copolymer.

15. A method according to claim 13, wherein the mixture comprises PE and PP in a ratio of from 5 to 50% by weight.

16. A method to claim 13, wherein the mixture comprises polyethylene and polypropylene in a weight ratio of polyethylene to polypropylene of from 1:12 to 5:1.

17. A method according to claim 12, wherein the base layer is an opaque layer that comprises vacuole-initiating fillers, and the density of the film is from 0.65 to 0.85 g/cm$^3$.

18. A method according to claim 12, wherein the thickness of the film is at least 50 μm.

19. A method according to claim 12, wherein the thickness of the inner top layer is between 0.5 and 5 μm.

20. A method according to claim 12, wherein the thickness of the outer top layer is between 0.3 and 5 μm.

21. A method according to claim 13, wherein the film comprises ethoxylated fatty acid amide in its base layer.

* * * * *